United States Patent
Little

(10) Patent No.: US 12,442,420 B2
(45) Date of Patent: Oct. 14, 2025

(54) MULTI-PURPOSE DRIVE SYSTEM FOR TRAILER JACKS AND STRAP WINCHES

(71) Applicant: Kenneth David Little, Orlando, FL (US)

(72) Inventor: Kenneth David Little, Orlando, FL (US)

( * ) Notice: Subject to any disclaimer, the term of this patent is extended or adjusted under 35 U.S.C. 154(b) by 375 days.

(21) Appl. No.: 18/182,315

(22) Filed: Mar. 10, 2023

(65) Prior Publication Data

US 2024/0301919 A1   Sep. 12, 2024

(51) Int. Cl.
| | | |
|---|---|---|
| *F16D 1/108* | (2006.01) | |
| *B66D 1/14* | (2006.01) | |
| *B60D 1/66* | (2006.01) | |
| *B60P 7/08* | (2006.01) | |
| *B60S 9/04* | (2006.01) | |

(52) U.S. Cl.
CPC ............... *F16D 1/108* (2013.01); *B66D 1/14* (2013.01); *B60D 1/66* (2013.01); *B60P 7/0846* (2013.01); *B60S 9/04* (2013.01)

(58) Field of Classification Search
CPC ........ B60D 1/246; B60D 1/66; B25B 21/002; F16D 1/108; B60S 9/04; B60S 9/06; B60S 9/08; B23B 51/12; B23B 39/10; B23B 47/26
See application file for complete search history.

(56) References Cited

U.S. PATENT DOCUMENTS

| | | | | |
|---|---|---|---|---|
| 3,490,547 | A * | 1/1970 | Stewart | B25F 3/00 173/217 |
| D389,387 | S * | 1/1998 | Barrett | D8/70 |
| 6,010,154 | A * | 1/2000 | Payne | B60S 9/08 81/176.15 |
| 6,467,716 | B1 * | 10/2002 | Hamilton | B65H 54/585 410/103 |
| 6,467,755 | B2 * | 10/2002 | Reilly | B60P 7/0846 254/223 |
| 6,526,850 | B1 * | 3/2003 | Miller | B60S 9/04 81/177.2 |
| 6,705,597 | B1 * | 3/2004 | Reilly | B60P 7/0846 254/223 |
| 6,729,604 | B1 * | 5/2004 | Claycomb | B60P 7/0846 24/69 CT |
| 7,278,808 | B1 * | 10/2007 | Sisk, Sr. | B60P 7/0853 279/144 |
| 7,802,499 | B2 * | 9/2010 | Stephens | B25B 13/065 81/125 |
| D629,820 | S * | 12/2010 | Van Ryswyk | D15/139 |
| D705,282 | S * | 5/2014 | Jones, Jr. | D15/139 |
| 9,114,965 | B2 * | 8/2015 | Reynolds | B66F 13/00 |
| 9,156,652 | B1 * | 10/2015 | Warboys | B65H 79/00 |
| 9,616,801 | B2 * | 4/2017 | Williams | B60P 7/0846 |

(Continued)

*Primary Examiner* — David B. Thomas

(57) ABSTRACT

The Drive System consists of a Dual-Purpose Driver (100) and an Adapter 200, allowing a battery powered drill to drive either a Sidewind Dropleg Trailer Jack or a Strap Winch. The Dual-Purpose Driver (100) inserts into a Strap Winch or into the Adapter 200 which replaces the handle of a Sidewind Dropleg Trailer Jack. The hex rod (10) inserts into the battery powered drill. Spring loaded buttons (50) protruding from the hollow cylinder (20) of the Dual-Purpose Driver 100 engage the Strap Winch, while slots (40) slide over a pin 140 in the Adapter 200.

10 Claims, 8 Drawing Sheets

(56) References Cited

U.S. PATENT DOCUMENTS

| | | | |
|---|---|---|---|
| 10,280,037 B2* | 5/2019 | Henderson | B60P 7/0846 |
| 10,464,193 B2* | 11/2019 | Chen | B25B 23/0078 |
| 10,640,326 B2* | 5/2020 | Henderson | B60P 7/083 |
| 11,001,472 B2* | 5/2021 | Henderson | B65H 75/305 |
| 12,263,706 B2* | 4/2025 | Mack | B60S 9/08 |
| 2006/0097235 A1* | 5/2006 | Wu | B66F 3/12 |
| | | | 254/126 |
| 2011/0079967 A1* | 4/2011 | Presley | B66D 1/12 |
| | | | 279/145 |
| 2015/0197127 A1* | 7/2015 | Magestro | B60S 9/18 |
| | | | 173/217 |
| 2022/0072686 A1* | 3/2022 | Martin | B25B 21/002 |
| 2024/0198745 A1* | 6/2024 | Mack | B60D 1/66 |
| 2024/0300035 A1* | 9/2024 | Lewis | B23B 39/10 |
| 2024/0391430 A1* | 11/2024 | Richardson | B60D 1/66 |

* cited by examiner

MULTI-PURPOSE DRIVE SYSTEM FOR TRAILER JACKS AND STRAP WINCHES

BACKGROUND OF THE INVENTION

The invention relates to driving trailer jacks and strap winches.

When not attached to a truck, the front end of a trailer is supported by a Sidewind Dropleg Trailer Jack, as shown in FIG. 1. In the example in FIG. 1A, there are two jacks, thus the configuration is called a Dual Sidewind Dropleg Trailer Jack. In the example of FIG. 1B, there is one jack, thus the configuration is called a Single Sidewind Dropleg Trailer Jack.

To raise or lower the trailer, the jack handle is lifted out of its support clips, engaged in the drive slot, and rotated manually. There are $1^{st}$ and $2^{nd}$ gears in each jack to make the task easier, but it is an arduous task whenever the trailer and truck are coupled or decoupled, because of the large force and high number of rotations required to achieve the tasks.

Cargo is anchored to a flatbed trailer using multiple straps, each of which is wound around the shaft of a strap winch, typically configured as shown in FIG. 7. The strap is wound around the shaft by engaging the drive holes on the right. Strap winding can be done manually, or with a strap winder device.

BRIEF SUMMARY OF THE INVENTION

The invention is a multi-purpose drive system, also called "the drive system" herein, which uses a single multi-purpose driver for powered, rather than manual, winding of trailer jacks and strap winches.

BRIEF DESCRIPTION OF THE SEVERAL VIEWS OF THE DRAWINGS

The invention is explained in the following description in view of the drawings that show.

DETAILED DESCRIPTION OF THE INVENTION

The inventor has created a multi-purpose drive system which eliminates the manually intensive efforts of jacking the front end of a trailer, and rewinding the straps which secure the cargo on a flatbed trailer. The drive system, consisting of a jack adapter and a multi-purpose driver, allows a battery powered drill to rotate a Sidewind Dropleg Trailer Jack drive shaft. Additionally, the multi-purpose driver may be used without the Adaptor to rotate a strap winch.

Figure 1A:
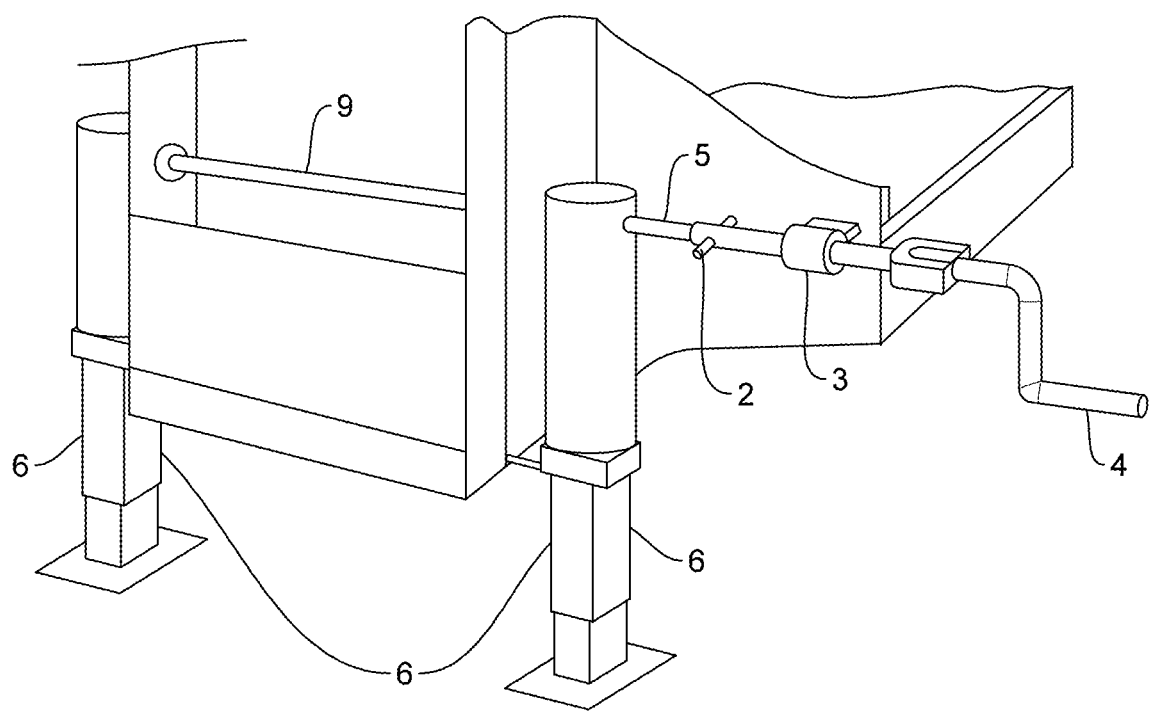
FIG. 1A is a view of a typical Dual Sidewind Dropleg Trailer Jack.
Figure 1B:
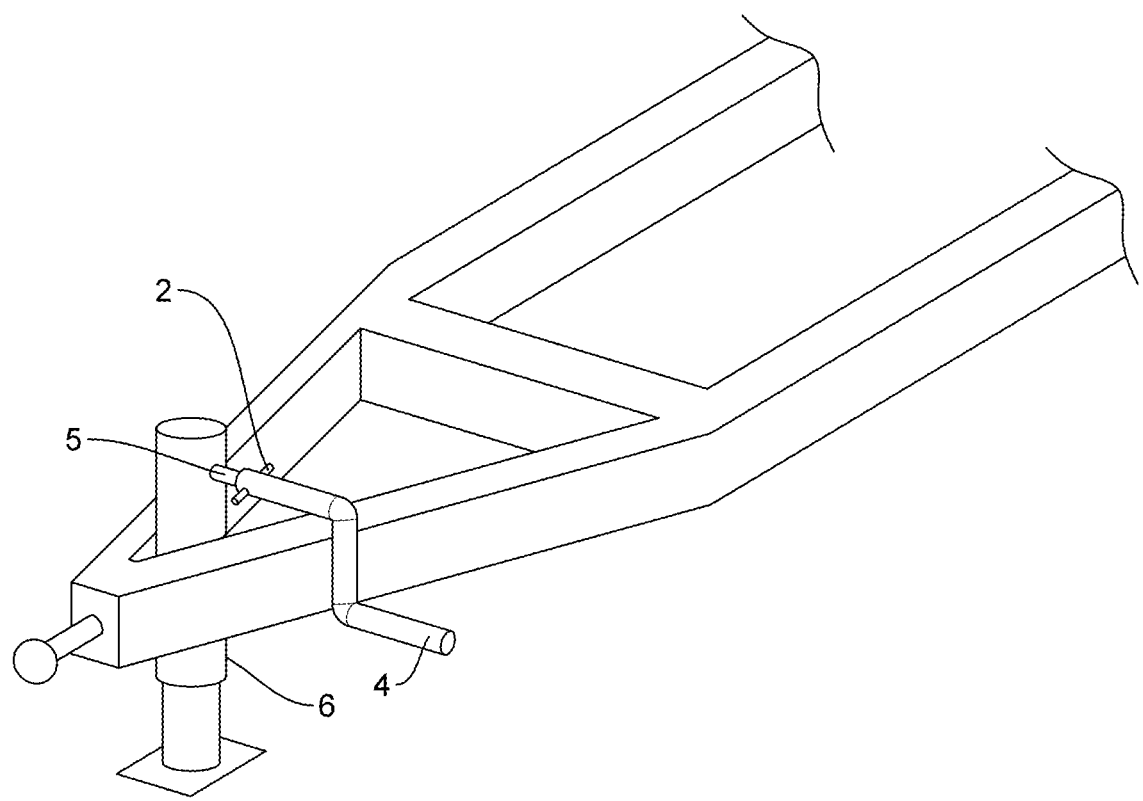
FIG. 1B is a view of a typical Single Sidewind Dropleg Trailer Jack.

A Dual Sidewind Dropleg Trailer Jack 8 is shown in FIG. 1A, and a Single Sidewind Dropleg Trailer Jack 6 is shown in FIG. 1B. Each Sidewind Dropleg Trailer Jack is driven by a handle 4. The two individual jacks 6 in the Dual Sidewind Dropleg Trailer Jack are connected by shaft 9. A handle 4 is manually rotated to drive gears in each jack which raise or lower the droplegs. The handle mechanism is supported by sleeve 3 in a Dual Sidewind Dropleg Trailer Jack configuration 8 and is attached to the Sidewind Dropleg Trailer Jack drive shaft 5 by bolt 2. In FIG. 1B it is seen that sleeve 3 is not required as handle mechanism is attached directly to the Single Sidewind Dropleg Trailer Jack drive shaft 5 by bolt 2.

To convert the Dual Sidewind Dropleg Trailer Jack 8 manual drive system shown in FIG. 1A to a drive system powered by a portable drill, bolt 2 in FIG. 1A is removed and the handle mechanism retracted through support sleeve 3. The small diameter pipe 120 of the jack adapter 200 shown in FIG. 2, is inserted through sleeve 3, slid over the drive shaft 5, and bolt 2 is reinstalled through drive hole 110 of the jack adapter 200 and the corresponding hole in the Dual Sidewind Dropleg Trailer Jack drive shaft 5.

To convert the Single Sidewind Dropleg Trailer Jack 6 manual drive system shown in FIG. 1B to a drive system powered by a portable drill, bolt 2 in FIG. 1B and the handle mechanism are removed. The small diameter pipe 120 of the jack adapter shown in FIG. 2, is slid over the drive shaft 5, and bolt 2 is reinstalled through drive hole 110 of the jack adapter 200 and the corresponding hole in the Single Sidewind Dropleg Trailer Jack drive shaft 5.

Figure 2:
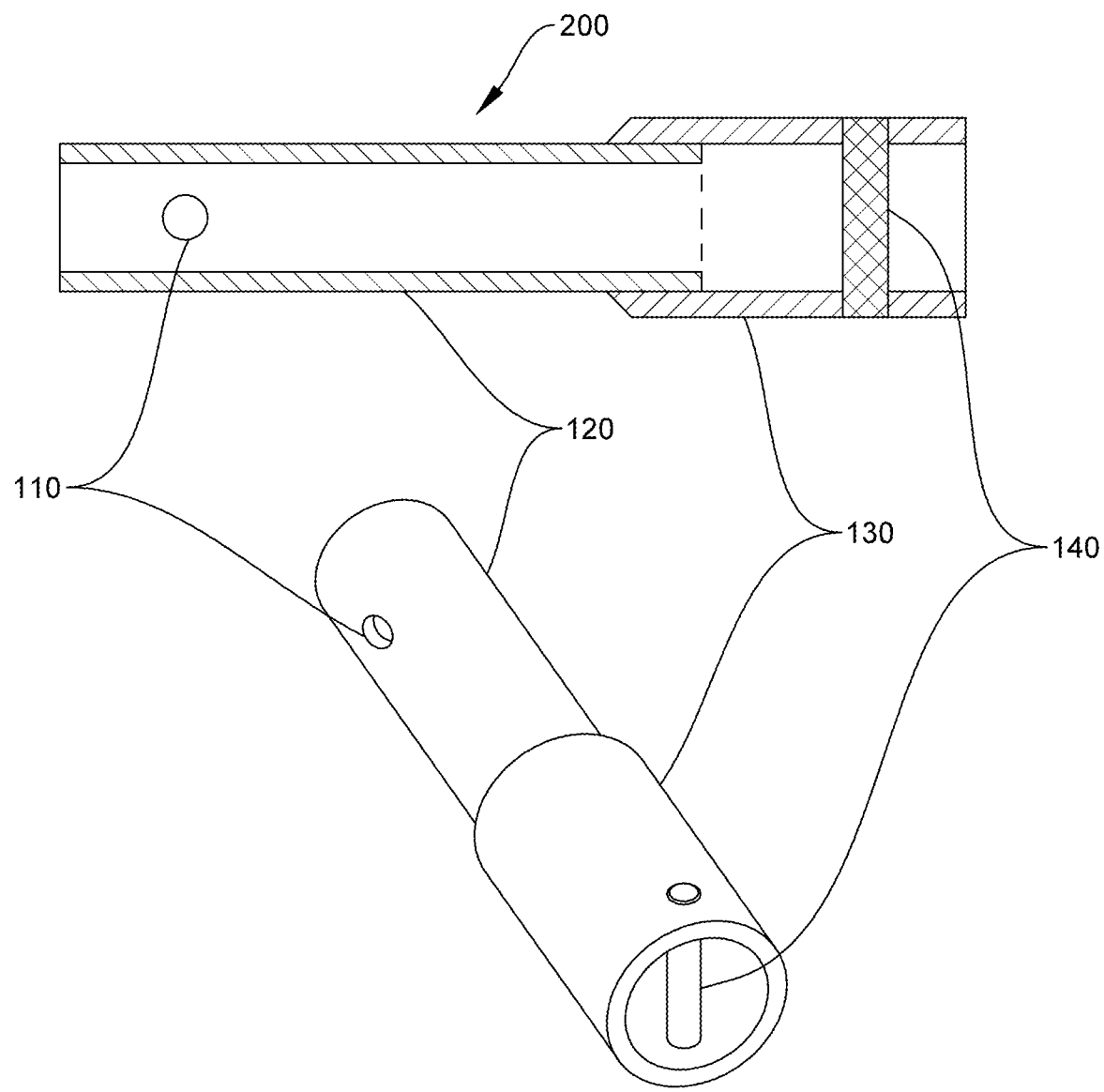
FIG. 2 is a side sectional and an oblique view of a jack adapter.
Figure 3:
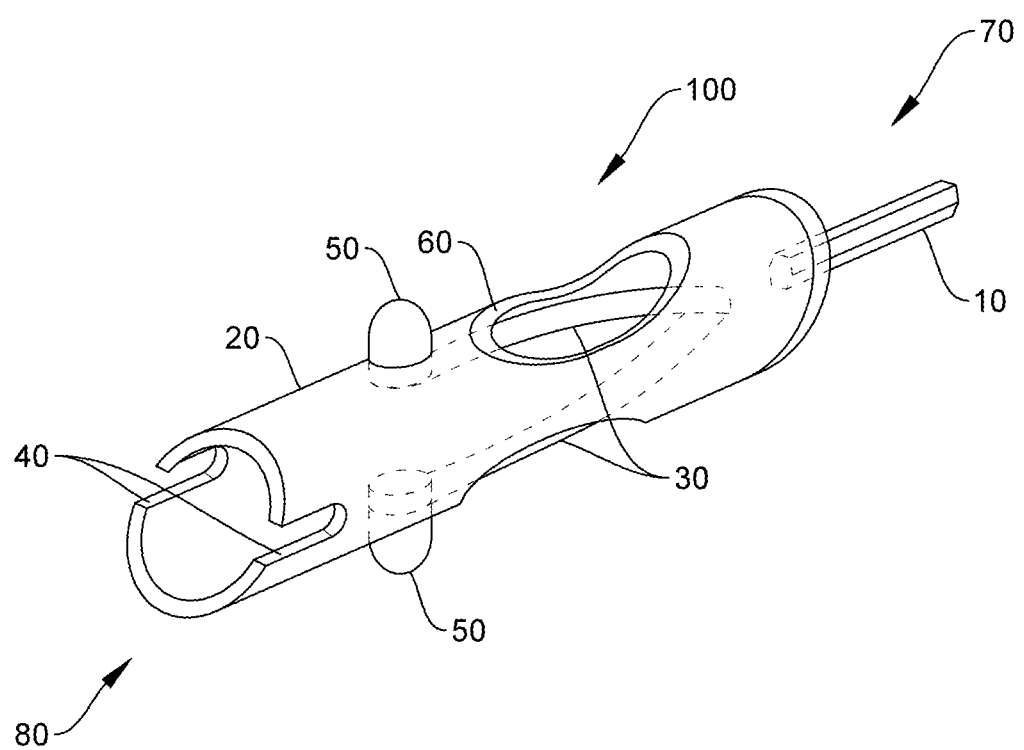
FIG. 3 is an oblique view of a first embodiment of a multi-purpose driver.
Figure 4:
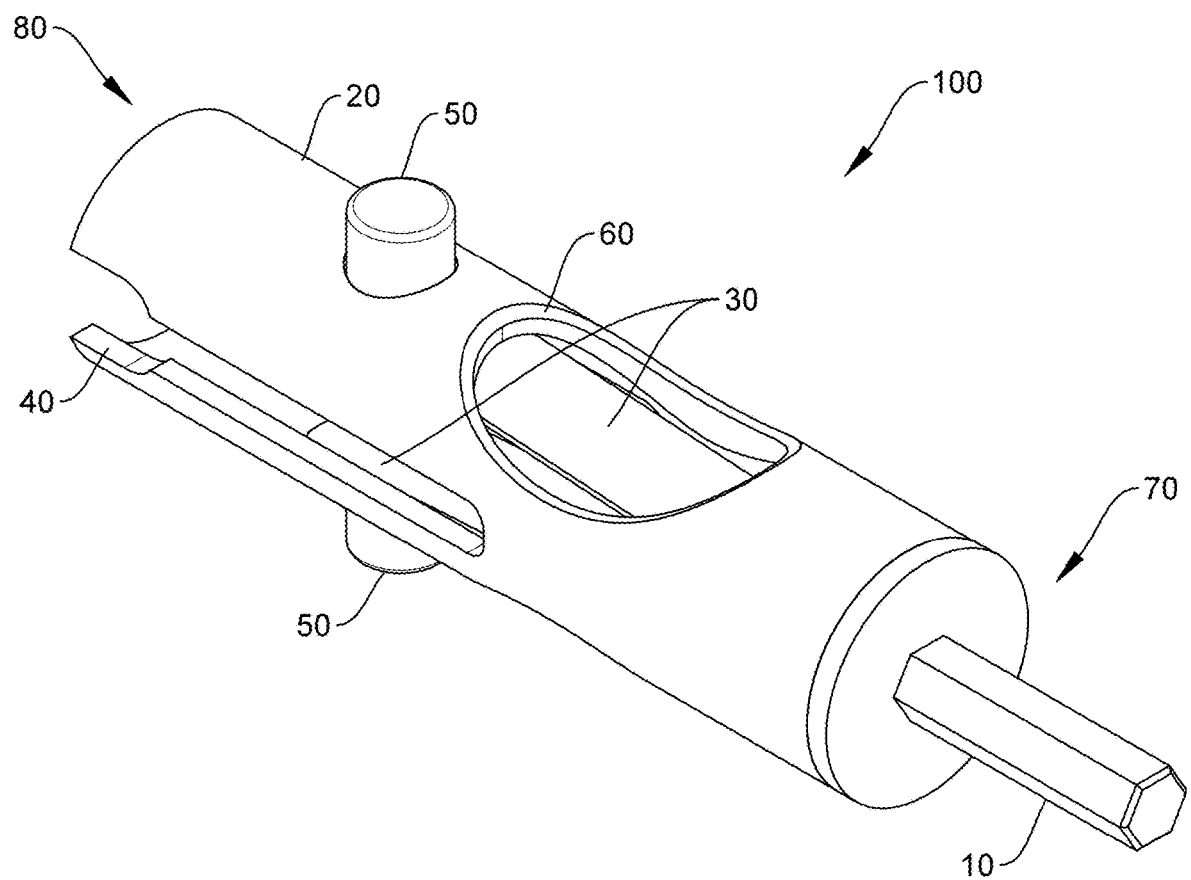
FIG. 4 is an oblique view of a second embodiment of a multi-purpose driver.
Figure 5:
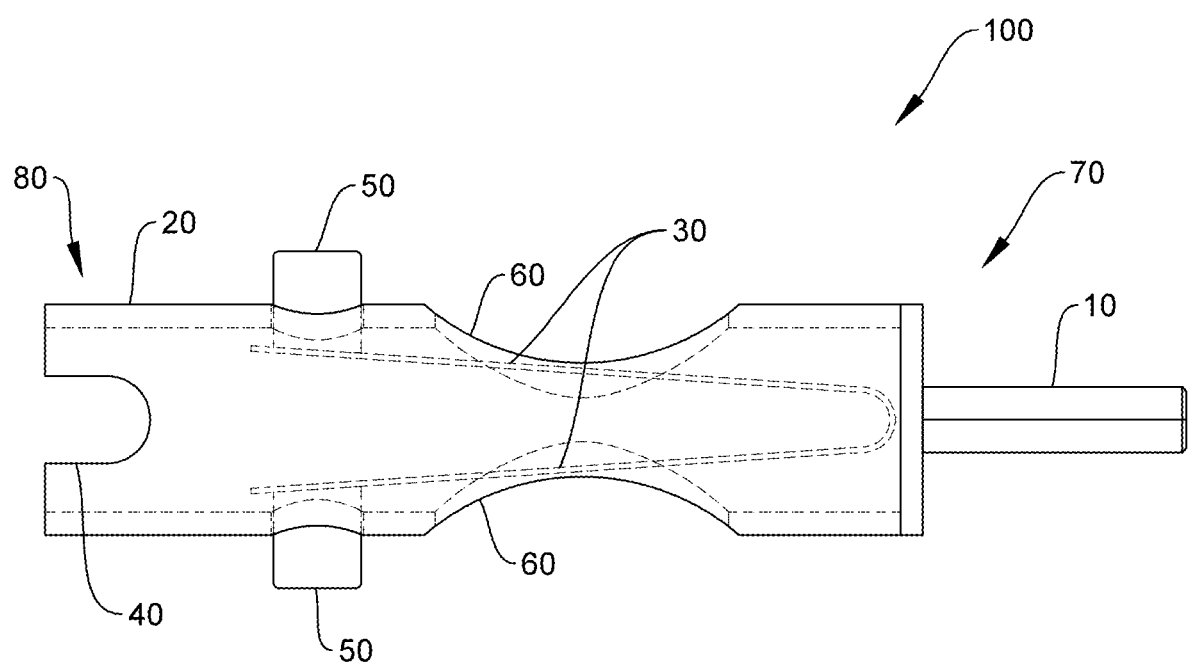
FIG. 5 is a side view of a first embodiment of a multi-purpose driver.
Figure 6:
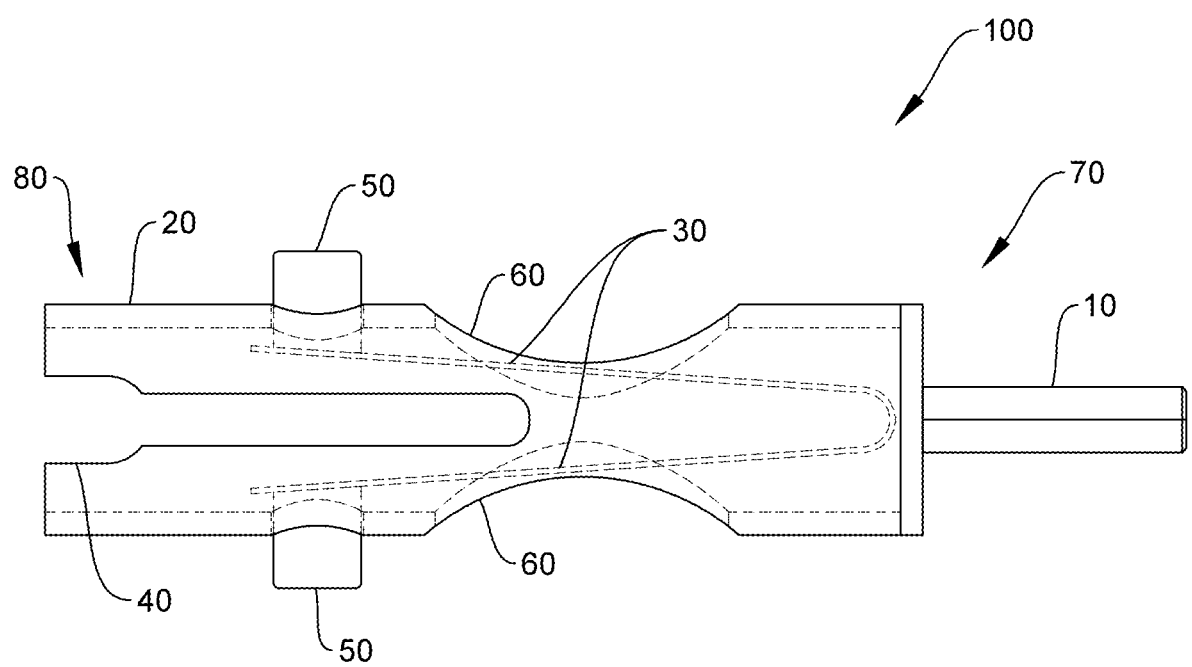
FIG. 6 is a side view of a second embodiment of a multi-purpose driver.

The first purpose of the multi-purpose driver is to drive trailer jacks, the hex shaft 10 of the multi-purpose driver 100 shown in FIG. 3 through FIG. 6 is inserted into a battery powered drill and the hollow cylinder 20 of the multi-purpose driver 100 is inserted into the jack adapter 200 shown in FIG. 2 such that the slots 40 in the multi-purpose driver 100 fully engage the pin 140 of the jack adapter 200. Raising or lowering the trailer is accomplished by changing the rotation direction of the battery powered drill.

Figure 7:
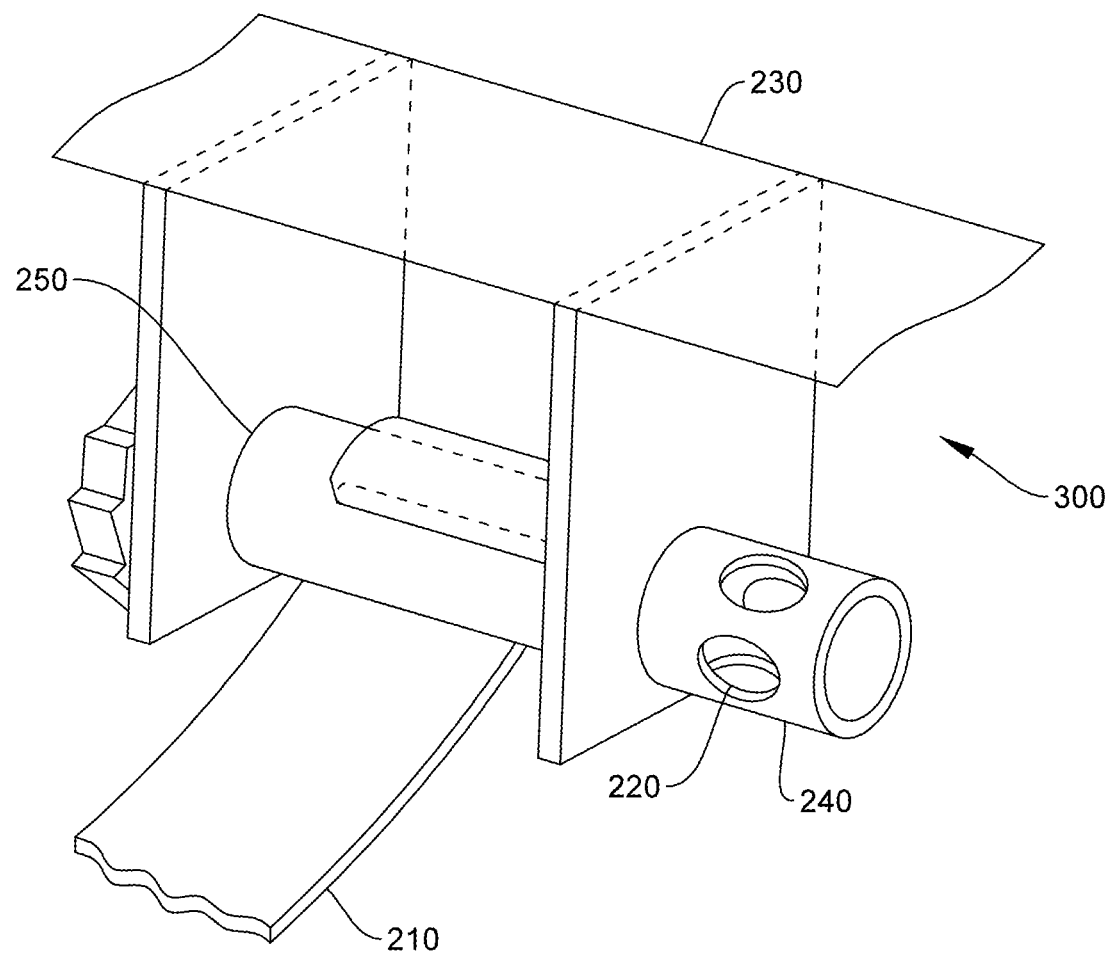
FIG. 7 is an oblique view of a strap winch.

The second purpose of the multi-purpose driver 100 shown in FIG. 3 through FIG. 6 is to rewind strap 210 into the strap winch 300 installed in a trailer rail 230, shown in FIG. 7. The multi-purpose driver 100's hollow cylinder 20 is inserted into the drive end 240 of the strap winch 300's shaft 250. Buttons 50 of the Double Button Spring Clip 30 are retracted into the hollow cylinder 20 by pressing together the Double Button Spring Clip 30 until the buttons allow the multi-purpose driver 100 to slide into the drive end 240, then are released, allowing the buttons to engage 2 of the 4 holes 220 in the drive end 240. Rotating the multi-purpose driver 100 then rotates shaft 250 of the strap winch 300 and winds strap 210 onto the shaft 250. When the strap is fully rewound, the buttons are retracted into cylinder 210 by pressing together the Double Button Spring Clip 30 allowing withdrawal of the multi-purpose driver 100 from the strap winch 300.

From the foregoing it is evident that the inventor has developed a multi-purpose drive system, which when driven by a battery powered drill, eliminates the intensive manual labor associated with raising or lowering a trailer. The drive system is simple, effective and practical. In addition, the multi-purpose driver of the drive system can be used alone to wind strap winches associated with flatbed trailers.

While a limited number of embodiments of the present invention has been shown and described within, numerous variations, changes and substitutions may be made without departing from the intent of the invention. Accordingly, it is intended that the invention be limited only by the spirit and scope of the appended claims.

What is claimed is:

1. A Multi-purpose drive system, comprising:
    a. A jack adapter, the jack adapter comprising a small diameter pipe attached to a large diameter pipe, the small diameter pipe has two drive holes passing through the small diameter pipe, the small diameter pipe configured to slide over a drive shaft of a sidewind dropleg trailer jack such that a bolt can be installed through one drive hole of the small diameter pipe, through the drive shaft, and through the other drive hole, thereby securing the small diameter pipe to the drive shaft, the large diameter pipe having a pin;
    b. A multi-purpose driver, the multi-purpose driver comprising a hollow cylinder and a double button spring clip, the multi-purpose driver having a first end and a second end, the multi-purpose driver having a hex shaft attached to the first end, the multi-purpose driver having two slots on the second end, the double button spring clip having two buttons, the double button spring clip being disposed within the multi-purpose driver such that the buttons protrude out through the multi-purpose driver, the second end configured to be inserted into a drive end of a shaft of a strap winch by pressing the buttons together, sliding the second end into the drive end of the strap winch, and releasing the buttons such that they engage with two holes in the drive end, the second end of the multi-purpose further configured to be inserted into the large diameter pipe of the jack adapter such that the two slots engage with the pin.

2. The Multi-Purpose drive system of claim 1, wherein:
    a. The sidewind dropleg trailer jack is a single sidewind dropleg trailer jack.

3. The drive system of claim 1, wherein:
    a. The sidewind dropleg trailer jack is a dual sidewind dropleg trailer jack with a support sleeve, and the small diameter pipe of the jack adapter is configured to be inserted through the support sleeve.

4. The drive system of claim 1, wherein:
    a. The hex shaft of the multi-purpose driver is configured to be inserted into a battery powered drill such that the rotational force applied to the hex shaft by the battery powered drill rotates the multi-purpose driver.

5. A method of using the drive system of claim 1, the method comprising:
    a. Inserting the hex shaft of the multi-purpose driver into a battery powered drill,
    b. Pressing the buttons of the double button spring clip into the hollow cylinder of the multi-purpose driver,
    c. Inserting the second end of the multi-purpose driver into the drive end of the shaft of the strap winch,
    d. Releasing the buttons such that they engage the holes in the drive end, and
    e. Operating the battery powered drill to rotate the shaft of the strap winch.

6. A drive system, comprising:
    a. An jack adapter, the jack adapter comprising a small diameter pipe attached to a large diameter pipe, the small diameter pipe having two drive holes passing through the small diameter pipe, the small diameter pipe configured to slide over a drive shaft of a sidewind dropleg trailer jack such that a bolt can be installed through one drive hole of the small diameter pipe, through the drive shaft, and through the other drive hole, thereby securing the small diameter pipe to the drive shaft, the large diameter pipe having a pin;
    b. A multi-purpose driver, the multi-purpose driver comprising a hollow cylinder and a double button spring clip, the multi-purpose driver having a first end and a second end, the multi-purpose driver having a hex shaft attached to the first end, the multi-purpose driver having two slots on the second end, the multi-purpose driver having two apertures allowing a user to press together the double button spring clip, the double button spring clip having two buttons, the double button spring clip being disposed within the multi-purpose driver such that the buttons protrude out through the multi-purpose driver, the second end configured to be inserted into a drive end of a shaft of a strap winch by pressing the buttons together, sliding the second end into the drive end of the strap winch, and releasing the buttons such that they engage with two holes in the drive end, the second end of the multi-purpose further configured to be inserted into the large diameter pipe of the jack adapter such that the two slots engage with the pin.

7. The drive system of claim 6, wherein:
    a. The sidewind dropleg trailer jack is a single sidewind dropleg trailer jack.

8. The drive system of claim 6, wherein:
    a. The sidewind dropleg trailer jack is a dual sidewind dropleg trailer jack with a support sleeve, and the small diameter pipe of the jack adapter is configured to be inserted through the support sleeve.

9. The drive system of claim 6, wherein:
    a. The hex shaft of the multi-purpose driver is configured to be inserted into a battery powered drill such that the rotational force applied to the hex shaft by the battery powered drill rotates the multi-purpose driver.

10. A method of using the drive system of claim 6, the method comprising:
    a. Inserting the hex shaft of the multi-purpose driver into a battery powered drill,
    b. Pressing the buttons of the double button spring clip into the hollow cylinder of the multi-purpose driver,
    c. Inserting the second end of the multi-purpose driver into the drive end of the shaft of the strap winch,
    d. Releasing the buttons such that they engage the holes in the drive end, and
    e. Operating the battery powered drill to rotate the shaft of the strap winch.

* * * * *